United States Patent [19]
Ota

[11] Patent Number: 5,319,642
[45] Date of Patent: Jun. 7, 1994

[54] METHOD OF COMMUNICATION USING A TWO-WAY BUS WITH CONTENTION DETECTION

[75] Inventor: Takeshi Ota, Kanagawa, Japan

[73] Assignee: Fuji Xerox Co., Ltd., Tokyo, Japan

[21] Appl. No.: 873,232

[22] Filed: Apr. 24, 1992

[30] Foreign Application Priority Data

Apr. 26, 1991 [JP] Japan .................... 3-097405

[51] Int. Cl.$^5$ ............................. H04J 14/08
[52] U.S. Cl. .................... 370/85.3; 370/94.3; 359/118; 359/136
[58] Field of Search ............ 370/85.2, 85.3, 85.1, 370/108, 94.1, 94.3; 359/136, 135, 118, 120, 121

[56] References Cited

U.S. PATENT DOCUMENTS 4,894,819  1/1990  Kondo et al. ............... 359/136
5,237,696  8/1993  Best ......................... 370/85.2

FOREIGN PATENT DOCUMENTS 3-296332  12/1991  Japan .

OTHER PUBLICATIONS

Fibernet: Multimode Optical Fibers For Local Computer Networks, E. G. Rawson et al., IEEE Transactions On Communications, vol. Com-26, No. 7, Jul. 1978, pp. 983-990.

*Primary Examiner*—Wellington Chin
*Assistant Examiner*—Min Jung
*Attorney, Agent, or Firm*—Finnegan, Henderson, Farabow, Garrett & Dunner

[57] ABSTRACT

A communication system using a two-way bus capable of detecting contentions from nodes other than nodes concerned in communication to ensure confidentiality of communication. A plurality of nodes are connected to a two-way multiple access bus. A transmitting node first monitors the multiple access bus for contention detection before transmission and then transmits a packet only when the bus is not busy. The transmitting node further monitors the multiple access bus for a predetermined time period even after the start of transmission. In the meantime, a receiving node transmits an answer after a predetermined wait time upon reception of the packet addressed to itself. Assuming that the maximum two-way propagation delay time of the multiple access bus is $\tau_0$, the predetermined time period during which the transmitting node monitors the multiple access bus after the start of transmission for contention detection is $\tau_1$, and the wait time between the reception of the packet by the receiving node and the start of transmission of the answer is $\tau_2$, such that the relationship $\tau_0 < \tau_1 < \tau_2$ is satisfied.

3 Claims, 4 Drawing Sheets

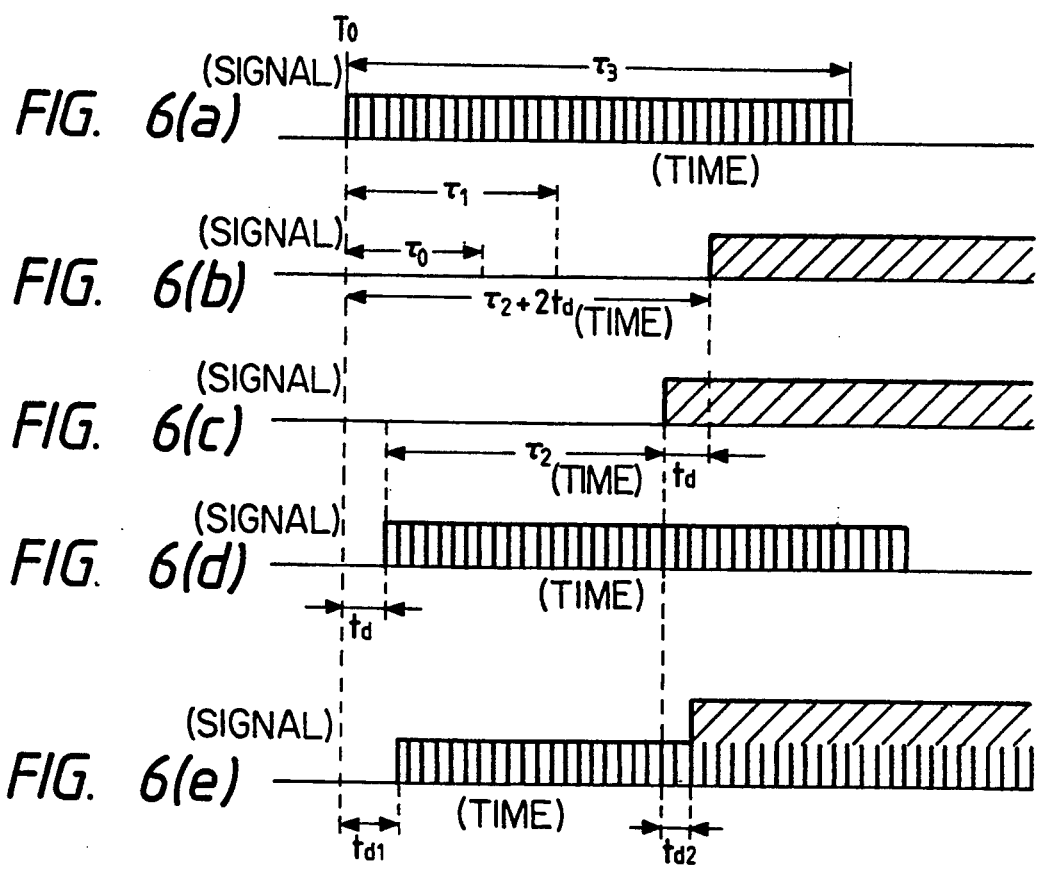

METHOD OF COMMUNICATION USING A TWO-WAY BUS WITH CONTENTION DETECTION

BACKGROUND OF THE INVENTION

The invention relates to a protocol (communication control procedure) in LANs (Local Area Networks), and more particularly, to a communication system for controlling communications by detecting contentions in a network.

Generally, in a LAN a plurality of nodes are connected to a bus and the nodes are intercommunicated through the bus. A multiple access bus is one of the buses used in such a LAN. The term "multiple access bus" means a bus that allows a signal transmitted from a certain node to be received by all the nodes simultaneously. Ethernet ® is one well known LAN using this multiple access bus and its protocol is called "CSMA/CD (Carrier Sense Multiple Access/Contention Detection) and standardized as IEEE 802.3.

Ethernet ® employs a coaxial cable as a transmission medium. Nodes are connected to the coaxial cable and a transmitting node first checks whether a signal is present on the coaxial cable from another node and then starts its transmission if such signal is absent. However, in such a case, it is likely that two or more nodes will start transmitting messages simultaneously. This condition is called a "contention" and Ethernet ® detects contentions by a voltage level.

A node that has detected a contention, waits for a random time after sending a jamming signal for a predetermined period of time. This jamming signal must be longer than the maximum round trip time within the network. The jamming signal serves to inform all the nodes connected to the network of the contention. The reason why the node waits for a random time is that, if the nodes that failed to transmit a message try to make transmissions all together simultaneously when the bus is not busy, a contention occurs again. Thus, each node is made to wait randomly to avoid recurrence of contentions.

Meanwhile, there is an increasing tendency to apply optical communication systems to LANs. However, optical LANs using optical fibers as transmission media cannot be expanded simply by providing taps as in the case of LANs configured by using a coaxial cable, to add nodes to the networks.

To overcome this problem, a network configuration has been proposed, in which terminals are provided separately for transmission and reception per node and star couplers are employed to distribute a signal to all nodes (E.G. Rawson, "Fibernet: Multimode Optical Fibers for Local Computer Networks," IEEE Transactions on Communications, Vol. COM-26, No. 7, July 1978).

If this star coupler is of a passive type, an increase in the number of nodes to be connected to such a star coupler leads to reduce the level of a received signal per node. To avoid this problem, it is conceivable to use a star coupler of an active type. However, a new problem arises therefrom when nodes are to be additionally provided. That is, when accommodating the addition of nodes by combining a plurality of star couplers, each star coupler having a predetermined number of terminals, a feedback loop is formed between the interconnected star couplers, causing inconvenience such as oscillation. For this reason, when using an active star coupler, the maximum number of connectable nodes is equal to the number of terminals predetermined per star coupler.

To overcome this problem, the applicant of the invention proposed in Published Unexamined Japanese Patent Application No. 296332/1991 a technique for forming no feedback loop even if a plurality of star couplers are combined. The technique involves the star coupler in which every transfer constant between input terminal and output terminal is zero. And in an optical communication network configured by interconnecting such star couplers as shown in the specification of the above application, a transmitting node does not have its transmitting signal returned to itself. Therefore, a node in transmission is ready to receive a signal from another node, allowing the node to transmit and receive signals simultaneously. That is, the optical communication network disclosed in the aforesaid specification forms a two-way bus.

With respect to a network configured by a combination of star couplers, the present inventor proposes two-way communication implemented by a single optical fiber in the co-pending U.S. patent application no. 07/813,443 the disclosure of which is incorporated herein for reference.

To implement two-way communication on the aforesaid two-way bus, when communication is started between a first node and a second node, the possibility is not excluded that a third node, i.e., a node other than the concerned party, will start transmitting a message. The contention caused by the third node is similar to a contention caused by another transmitting node in one-way communication.

In a network using a multiple access bus such as in Ethernet ®, a signal transmitted by a node can be received by all other nodes, which is not preferable from the viewpoint of confidentiality.

SUMMARY OF THE INVENTION

In view of the above, an object of the invention is to provide a communication system capable of detecting a contention from a third node other than parties concerned to ensure confidentiality of communication in a network using a two-way bus.

The above, and other objects of the present invention are accomplished by the provision of a communication system using a two-way bus comprising the steps of connecting a plurality of nodes to a multiple access bus having a bidirectionality, causing a transmitting node to monitor the multiple access bus for contention detection before transmission and then transmit a packet only when said bus is not busy, further causing the transmitting node to monitor said multiple access bus for a predetermined period after the start of transmission, and causing a receiving node to start transmitting an answer after a predetermined wait time upon reception of the packet addressed to itself, $\tau_0 < \tau_1 < \tau_2$ being satisfied where $\tau_0$ is representative of a maximum round trip time of the multiple access bus, $\tau_1$ is representative of the predetermined period for which the transmitting node monitors the multiple access bus after the start of transmission for contention detection, and $\tau_2$ is representative of the wait time between the reception of the packet by the receiving node and the start of transmitting an answer.

The transmitting node monitors the communication line prior to the start of a transmission, and if no signal has been detected, it starts the transmission, judging that there is no contention. The transmitting node continues monitoring the communication line for a time period r even after the start of the transmission. The receiving node, upon reception of a packet addressed to itself, starts transmitting its answer after a predetermined wait time $\tau_2$. Since the monitoring time $\tau_1$ is longer than the maximum round trip time $\tau_0$ of the multiple access bus, a transmission from the third node can be detected without fail. Since the wait time $\tau_2$ is longer than the monitoring time $\tau_1$, there is no such likelihood that the transmitting node will take the answer from the receiving node for a contention from another node.

BRIEF DESCRIPTION OF THE ACCOMPANYING DRAWINGS

Figure 1:
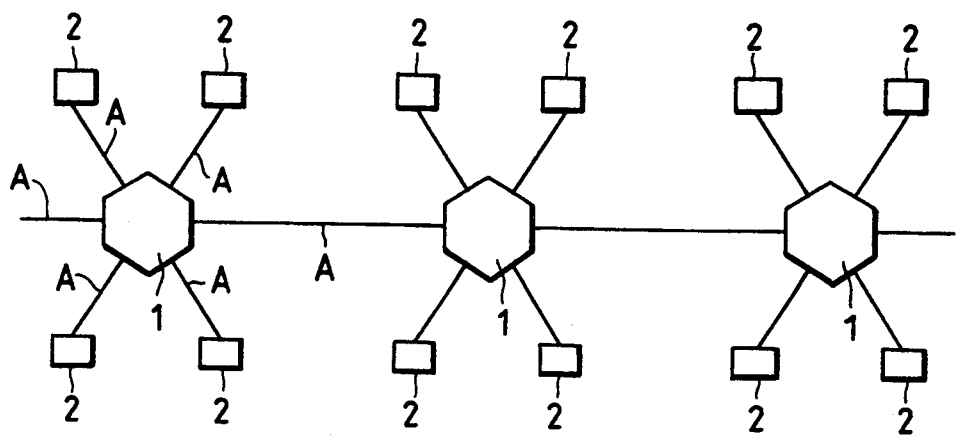
FIG. 1 is a schematic diagram showing an optical communication network configured by using 6-terminal star couplers to which a communication system of the invention is applied.
Figure 5:
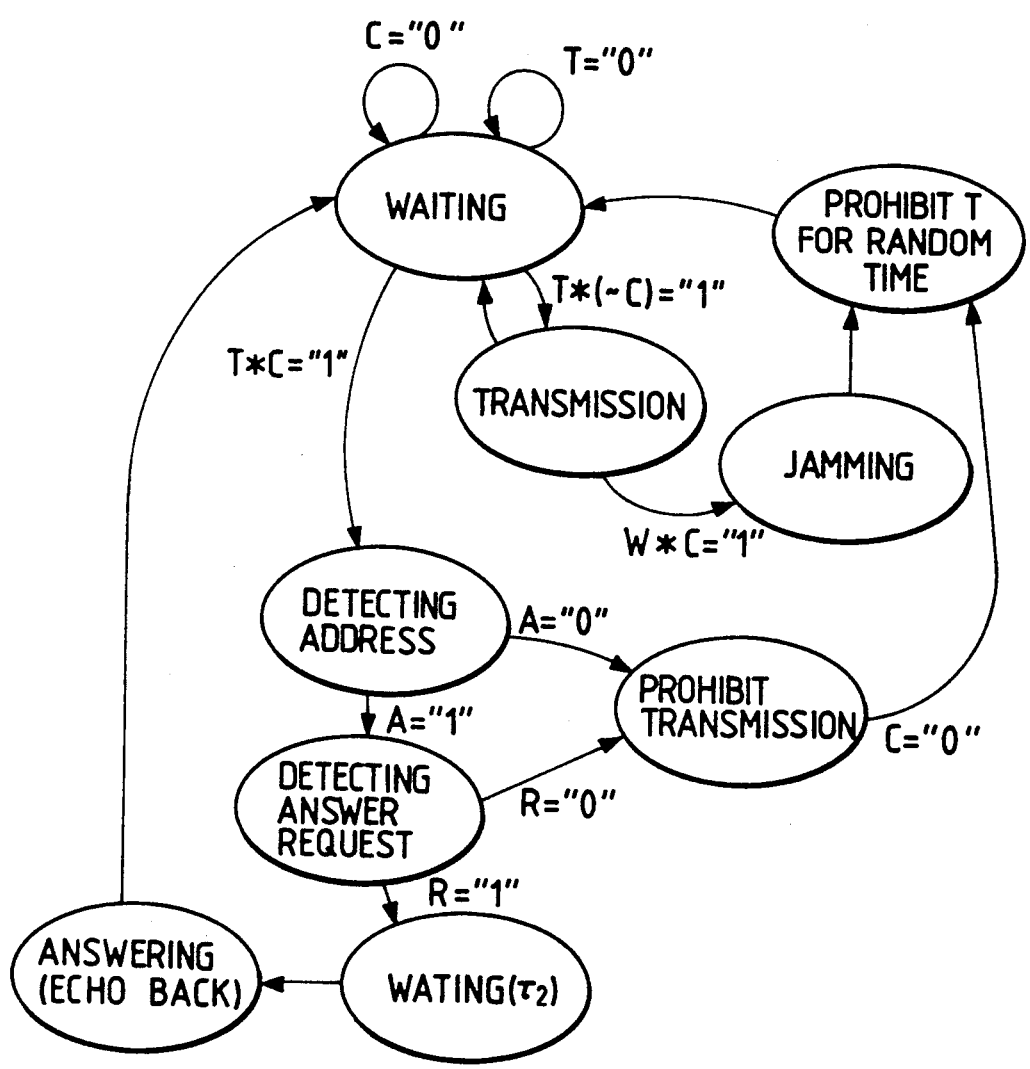

FIGS. 4(a) to 4(e) are waveform diagrams showing signals at the transmission ports and reception ports of nodes, respectively;

FIG. 5 is a state transition diagram showing a protocol in the FIG. 1 network; and FIGS. 6(a) to 6(e) are waveform diagrams showing signals at the transmission ports and reception ports of nodes in a modified example, respectively.

DESCRIPTION OF THE PREFERRED EMBODIMENTS

Referring to the drawings, features of the invention will be described based on its specific embodiments.

FIG. 1 is a schematic diagram showing a configuration of an optical communication network implemented by using 6-terminal star couplers to which a communication system of the invention will be applied.

In the FIG. 1, three 6-terminal star couplers 1 are indicated, Nodes 2 are connected to four out of the six terminals of each star coupler 1 through two-way, multiple access buses A, while the star couplers 1 are interconnected, using the remaining two terminals through the bus A.

Figure 2:
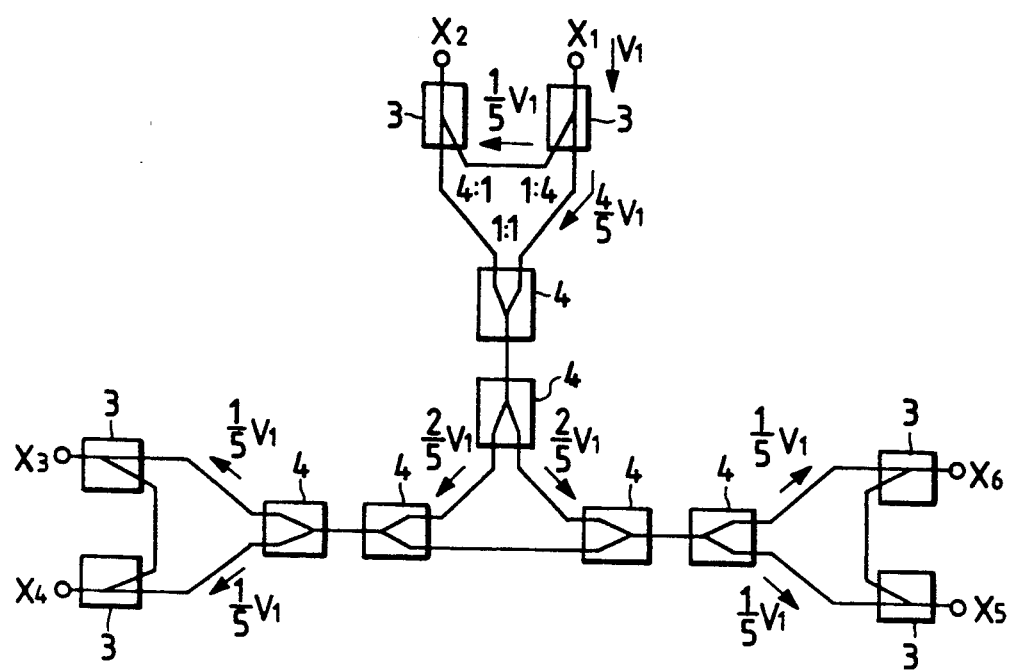
FIG. 2 is a schematic diagram showing an exemplary configuration of a 6-terminal star coupler used in the FIG. 1 network.

FIG. 2 shows an exemplary configuration of the 6-terminal star coupler 1. The combination of optical distributing/synthesizing units 3, each having a distribution ratio of 4:1, and optical distributing/synthesizing units 4, each having a distributing ratio of 1:1, allows a signal $v_1$ injected from a terminal $x_1$ to be distributed to a terminal $x_2$ by $(1/5) v_1$, with the remaining $(4/5) v_1$ being further distributed as shown in FIG. 2. As a result, a signal $(1/5) v_1$ is distributed to each of the terminals $x_2, x_3, x_4, x_5, x_6$. The same applies to each of input signals $v_2, v_3, v_4, v_5, v_6$ from the terminals $x_2, x_3, x_4, x_5, x_6$. The relationship between the input signals $v_1, v_2, v_3, v_4, v_5, v_6$ to and output signals $w_1, w_2, w_3, w_4, w_5, w_6$ from the terminals $x_1, x_2, x_3, x_4, x_5, x_6$, respectively, i.e., the transfer function can be expressed as shown in equation (1), using a determinant.

$$\begin{pmatrix} w_1 \\ w_2 \\ w_3 \\ w_4 \\ w_5 \\ w_6 \end{pmatrix} = \begin{pmatrix} 0 & 1/5 & 1/5 & 1/5 & 1/5 & 1/5 \\ 1/5 & 0 & 1/5 & 1/5 & 1/5 & 1/5 \\ 1/5 & 1/5 & 0 & 1/5 & 1/5 & 1/5 \\ 1/5 & 1/5 & 1/5 & 0 & 1/5 & 1/5 \\ 1/5 & 1/5 & 1/5 & 1/5 & 0 & 1/5 \\ 1/5 & 1/5 & 1/5 & 1/5 & 1/5 & 0 \end{pmatrix} \begin{pmatrix} v_1 \\ v_2 \\ v_3 \\ v_4 \\ v_5 \\ v_6 \end{pmatrix} \quad (1)$$

Equation (1) means that the transfer constant between the corresponding terminals of the star couplers is zero, and this allows star couplers to be interconnected as shown in the aforesaid specification of Japanese Patent Application No. 98370/1990. A network configured by interconnecting such star couplers has bidirectionality.

Figure 3:
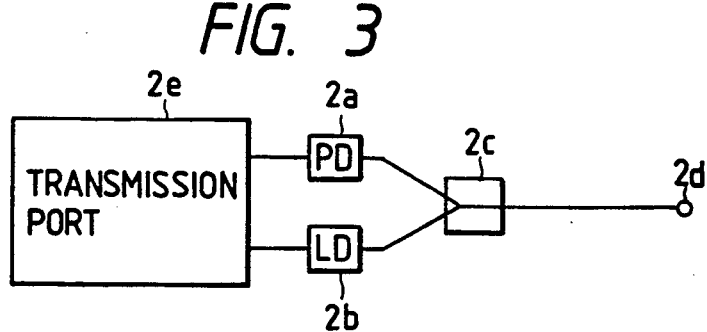
FIG. 3 is a schematic diagram showing an exemplary configuration of a node of the FIG. 1 network.
Figure 4A:
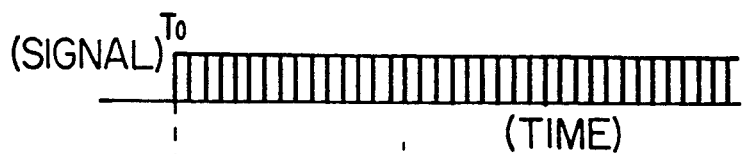
Figure 4B:
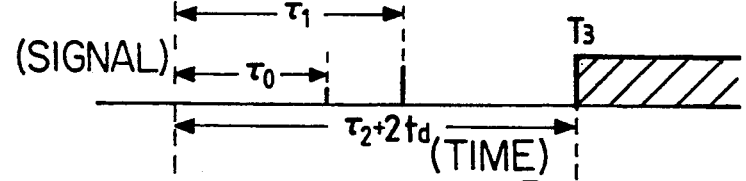
Figure 4C:
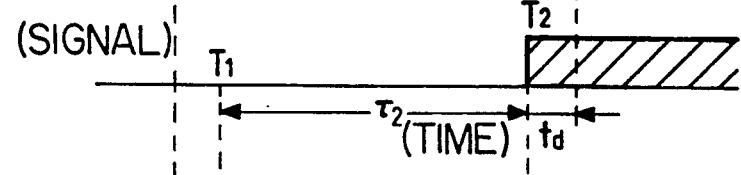
Figure 4D:
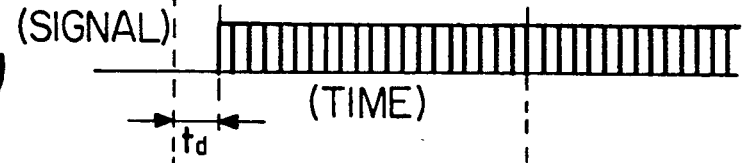
Figure 4E:
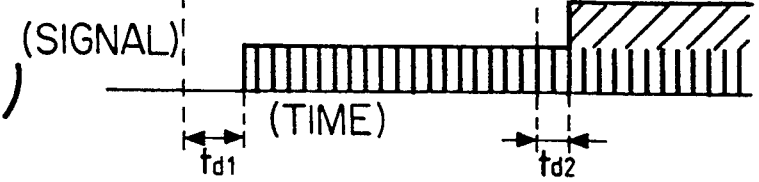

As shown in FIG. 3, a light-receiving unit 2a such as a photodiode and a light-emitting source 2b such as a laser diode are connected to each node 2 in the FIG. 1 network, and an optical signal is distributed and synthesized by an optical distributing/synthesizing unit 2c. A terminal 2d drawn from the optical distributing/synthesizing unit 2c is connected to a single terminal of each FIG. 1 star coupler 1. Reference character 2e is a terminal unit having both a transmission port and a reception port.

A protocol in the above network will be described next with reference to FIGS. 4(a) to 4(e). FIGS. 4(a to 4(e) show a signal in the transmission port of a transmitting node, a signal in the reception port of the transmitting node, a signal in the transmission port of an answering node, a signal in the reception port of the answering node, and a signal in the reception port of a third node, respectively.

When a node in the network transmits a signal, the node checks that no signal is received by its own reception port from another node before it starts transmission (see timing $T_0$ in FIG. 4 (a)). In FIG. 4 (a), a portion depicted by vertical lines shows a transmission signal. The transmission signal is transmitted to another node after the lapse of a delay time. This delay time varies depending on the distance between nodes. Because of this propagation delay time, there is the possibility that a plurality of nodes will start transmissions almost simultaneously. Such simultaneous transmission, or "contention," is detected, when viewed from a transmitting node, as a signal received from another node between the start of its transmission and the end of the maximum two-way propagation delay time $\tau_0$ of the network. In other words, the transmitting node can judge that no contention has occurred if no signal has been detected while it is monitoring its own reception port.

If some signal is detected within the predetermined time $\tau_1$ after the start of transmission (see FIG. 4 (b)), such detection is judged as being a contention. In such a case, the transmitting node transmits a jamming signal for a predetermined time, and then waits for a random time and starts transmission again thereafter.

When a node to receive a signal transmits an answer immediately after it has received the signal addressed to itself, the answer reaches the transmitting node within the monitor time $\tau_1$, causing the transmitting node to erroneously judge the presence of a contention. To avoid this problem, the transmission of an answer from the answering node is delayed for a predetermined time. Assuming that the answer wait time from the reception of a signal by the answering node (timing $T_1$) to the transmission of an answer signal (time $T_2$) is $\tau_2$, and the one-way propagation time between the transmitting node and the answering node is $t_d$ (see FIGS. 4 (c), (d)), then the time at which the transmitting node starts receiving the answer signal is $(\tau_2+2t_d)$ after the start of transmission (see timing $T_3$ in FIG. 4 (b)). In these figures, the portion depicted with crosses show an answer signal. Since $0<2t_2$, it is after the lapse of an answer delay time $\tau_2$ or more from the start of transmission by the transmitting node that the transmitting node starts receiving the answer signal. The one-way propagation time $t_d$ is shorter as the answering node is located closer to the transmitting node. If $\tau_1>\tau_2$, it is likely that the transmitting node will mistake the answer signal for a contention. Therefore, $\tau_1$ must be smaller than $\tau_2$, thus requiring that such a relationship as $\tau_0<\tau_1$ $\tau_2$ be satisfied.

Referring to a third node which is located farther away from the transmitting node than the answering node, a signal that appears at the reception port of the third node has a waveform such as shown in FIG. 4 (e). That is, the transmitting signal from the transmitting node is received when a time $t_{d1}$ has elapsed from the start of transmission by the transmitting node, and the answer signal from the answering node is received while superposed on the transmitting signal from the transmitting node when a time $t_{d2}$ has elapsed from the transmission of the answer signal from the receiving node. That is, what can be received by the third node is only the front portion of the transmission signal from the transmitting node, and upon start of transmission of the answer signal from the receiving node, the transmission signal from the transmitting node and the answer signal from the receiving node are so confused after a time $t_{d2}$ that both signals cannot be tapped. Therefore, arrangement of confidential messages after some packets will ensure secrecy of communication.

A protocol in the above network will be described as viewed from the transmitting side and from the answering side.

TRANSMITTING SIDE (1) The transmitting node transmits no message when it is found from a checking that a signal is being received by its reception port, and waits for a random time. If no signal is being received, the transmitting node starts transmission.

(2) When a signal appears at its reception port within the monitor time $\tau_1$ after the start of transmission, the transmitting node transmits a jamming signal for a predetermined time and then waits for a random time.

(3) A signal received after the lapse of the monitor time $\tau_1$ is received as an answer addressed to itself.

ANSWERING SIDE (1) When a signal has been received, the answering node accepts the signal after checking that the signal is addressed only to itself. It also judges whether or not the signal requests an answer.

(2) If the signal requests an answer, the answering node starts answering after the predetermined answer wait time $\tau_2$. An echo back processing, in which the received message is transmitted back as it is, is usually performed.

FIG. 5 shows the state transitions in controlling a transmission signal at nodes based on the above protocol.

Each node always receives a message from its reception port. A line condition parameter C is set to "1" when a carrier is present and to "0" when no carrier is present. It also judges whether or not a received packet is destined to itself by detecting the address incorporated in the packet, and a packet destination parameter A is set to "1" when the packet is destined to itself and to "0" when the packet is not destined to itself. An answer request parameter R is set to "1" when the packet is addressed to itself and requests an answer, and to "0" when the packet is addressed to itself but does not request an answer. A transmission request parameter T is set to "1" when there is a transmission request from a higher level control unit than itself, and to "0" when not. This parameter T is reset when the transmission of a requested packet has been completed. A time status parameter W is set to "1" when it is between the start of transmission and the end of the predetermined monitor time $\tau_1$, and to "0" when the monitor time $\tau_1$ has expired. The transmission of each node is controlled by these five parameters C, A, R, T, W.

The expression "Prohibit T for a random time" means that the parameter T indicating a transmission request from a higher level node is set to "0" only for a random time; it does not mean to reset T. By prohibiting T for a random time and entering a waiting state immediately thereafter, the node can respond even when the packet for which a transmission is requested to itself from another node immediately after a transmission failure has arrived. The prohibition of T for a random time assumes the same function as the contention recurrence avoiding mechanism in the Ethernet ®. Reference character T* ($\sim$C) is a logical expression meaning T AND (negated C). Similarly, W*C is a logical expression meaning W AND C, and T*C is a logical expression meaning T AND C.

The answer message is usually answered in the form of echo back in which the received message is sent back as it is. Accordingly, the transmitting node is informed that its transmission message has been transmitted to the destination node surely. In addition, the echo back serves to provide a jamming action to other nodes, thereby preventing the transmission message from being illegally received by other unconcerned nodes. In other words, confidentiality can be ensured.

Instead of echo back, a signal carrying a certain meaning may be sent back as an answer. However, packet exchange involves a one-way flow of voluminous data such as transmitting files, making it very unlikely to generate a data flow that is substantially the same as the bidirectional data flow. When preparing data having some meaning in both ways of communication, a relatively large increase in the overhead of higher level units of each node must result, making such technique almost unpractical. Therefore, it is desirable to use an echo back as an answer.

A packet must have a format in which a code explicitly indicating that the packet requests an answer is defined. Specifically, such a format as allotting a single control bit is allotted to the header portion of a packet and indicating the presence/absence of a transmission request by setting such control bit to "1" or "0."

While the confidentiality function is provided in the above embodiments, there are special cases where the level of confidentiality is somewhat reduced under certain conditions.

For example, line trouble and failure at a destination node may cause the destination node to fail to answer when it should answer, and in such a case, the presence of a signal from a transmitting node on the line causes the secrecy of communication to be lost.

A solution to this problem is to add a procedure that transmission is interrupted when there is no answer after the lapse of a predetermined time $\tau_3$ from the start of transmission. Such a relationship as $\tau_3 > (\tau_2 + \tau_0)$ must be satisfied. FIGS. 6 (a) to (e) show the respective ports of respective nodes. Since FIGS. 6 (a) to (e) correspond to FIGS. 4(a) to (e), their description will be omitted.

According to this modified example, the transmission is terminated automatically in the absence of a transmission from a destination node, thereby ensuring confidentiality.

Data such as a password required for confidentiality must be located in a sufficiently rearward portion of a packet in both embodiments and the modified example.

While the single-fiber two-way communication is implemented by inputting and outputting an optical signal to and from a single terminal in the above embodiments, two optical fibers may be arranged for transmission and reception as disclosed in the specification of Published Unexamined Japanese Patent Application No. 296332/1991.

As described above, according to the present invention, an answer is sent back after the lapse of a predetermined time when a signal designed to a receiving node from a transmitting node is received by the receiving node. Therefore, not only a contention due to a signal from a third node can be detected by monitoring line conditions at the start of transmission, but also a signal on a signal path cannot be illegally received by the third node because both transmission and answer signals co-exist on the signal path after a certain timing.

What is claimed is:

1. A method of communication between a plurality of nodes comprising the steps of:

connecting said plurality of nodes to a multiple access bus having a bidirectionality, said multiple access bus have a maximum two-way propagation delay time $\tau_0$;

causing a transmitting node to monitor said multiple access bus for contention detection before a transmission of a packet and then causing said transmitting node to make said transmission only when said multiple access bus is not busy;

further causing said transmitting node to monitor said multiple access bus for a predetermined period $\tau_1$ after the start of said transmission; and causing a receiving node to start transmitting an answer after a predetermined wait time $\tau_2$ upon reception of said packet if said packet is addressed to said receiving node;

wherein $\tau_0 < \tau_1 < \tau_2$.

2. The method of communication as defined in claim 1 wherein said step of causing a receiving node to start transmitting an answer after a predetermined wait time $\tau_2$ comprises echoing back a message of said packet after said predetermined wait time $\tau_2$.

3. The method of communication as defined in claim 1 further comprising the step of interrupting said transmission of said transmitting node if said answer from said receiving node is not received by said transmitting node after a lapse of a predetermined time $\tau_3$ from the start of said transmission;

wherein $\tau_3 > \tau_2 + \tau_0$.

* * * * *